(No Model.)
E. W. RICE, Jr.
ELECTRIC RAILWAY.
No. 455,454. Patented July 7, 1891.
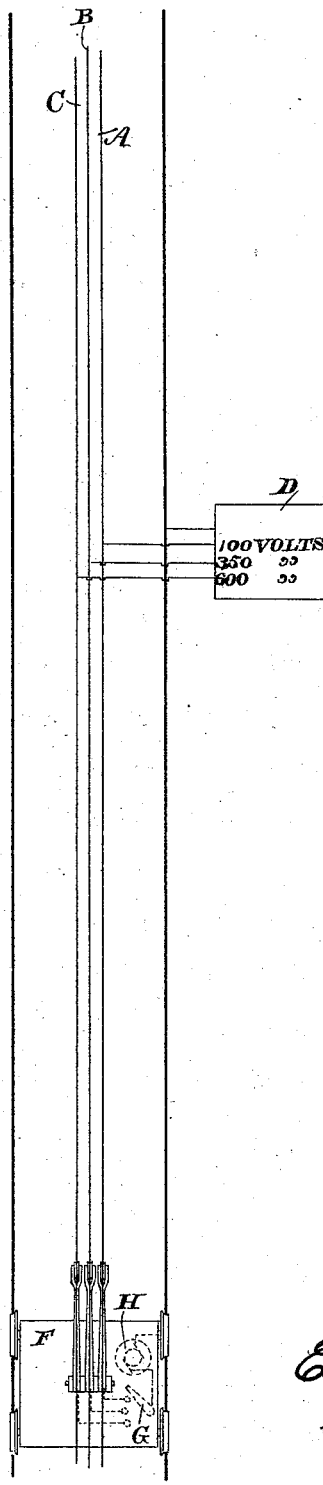
WITNESSES:
INVENTOR:
Edwin Wilbur Rice Jr.
by Barkley & Knight
ATTYS.

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

ELECTRIC RAILWAY.

SPECIFICATION forming part of Letters Patent No. 455,454, dated July 7, 1891.

Application filed March 30, 1891. Serial No. 386,895. (No model.)

*To all whom it may concern:*

Be it known that I, EDWIN WILBUR RICE, Jr., a citizen of the United States, residing at Lynn, in the county of Essex and State of Massachusetts, have invented a certain new and useful Improvement in Electric Railways, of which the following is a specification.

My invention relates to electric railways, especially those in which electric motors of great power are employed, and in which the regulation of such motors is a matter of difficulty.

My invention consists in extending along the line of the road two or more supply-conductors connected to generators of different electro-motive forces, and in providing the electric locomotives with apparatus by which the circuit of the motor may be complete through either one of the different supply-conductors. By means of this arrangement I am enabled to regulate the motor by admitting to it such electro-motive force as may be desirable.

Referring to the accompanying drawing, which represents in plan an electric railway equipped according to my invention, A, B, and C represent, respectively, supply-conductors extending along parallel with the railway in any well-known manner.

D represents a central station provided with generators giving different electro-motive forces, which are connected, respectively, to the supply-conductors. Thus conductor A may have a pressure of one hundred volts, B of three hundred and fifty volts, and C of six hundred volts, these pressures corresponding, respectively, to low speed, moderate speed, and high speed. Any number of conductors may be employed, and suitable electro-motive forces given to each, whereby the motor may have as many degrees of regulation as may be necessary.

F represents an electric locomotive having contact devices for each of the three supply-conductors A, B, and C. These contact devices are connected, respectively, to switch-plates, over which a switch-arm G may pass in succession, the said switch-arm being the regulating-lever controlled at will by the driver.

H represents a motor, one terminal being connected to switch-arm G and the other to the ground or return conductor. It will be understood, however, that any other suitable arrangement by which the motor may be put in circuit with either of the three conductors at will may be employed in place of the arrangement I have shown.

In operation the motor will be started by throwing the switch-arm and bringing the conductor A into circuit, on which the potential is one hundred volts. The winding of the motor will be such that a pressure of one hundred volts at starting will not be injurious. As the speed increases the second conductor B will be brought into circuit, and finally the conductor C will be used for the highest speed.

By means of the arrangements above described the motor may be regulated without the introduction of resistances or the variation of field-magnet strength, and without switches for connecting motors in different ways, such devices being the only means known at present for regulating motors, and being but poorly adapted for the purpose when motors of great size are used.

What I claim as new, and desire to secure by Letters Patent, is—

1. The combination, in an electric railway, of two or more supply-conductors parallel therewith connected, respectively, to generators of different electro-motive forces, and a vehicle on the railway provided with apparatus for bringing the propelling-motor into circuit with either of said supply-conductors at will.

2. The combination, in an electric railway, of two or more supply-conductors parallel therewith and connected, respectively, to generators of different electro-motive forces, and a vehicle on the railway provided with separate contact devices for the different supply-conductors, respectively, and with a switch in the motor-circuit adapted to connect with either of said contact devices at will.

In testimony whereof I have hereto set my hand this 28th day of March, 1891.

EDWIN WILBUR RICE, JR.

Witnesses:
JOHN T. BRODERICK,
JOHN W. GIBBONEY.